(12) United States Patent
Togashi

(10) Patent No.: US 7,663,862 B2
(45) Date of Patent: Feb. 16, 2010

(54) MULTILAYER CAPACITOR

(75) Inventor: Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 496 days.

(21) Appl. No.: 11/798,129

(22) Filed: May 10, 2007

(65) Prior Publication Data

US 2007/0274022 A1      Nov. 29, 2007

(30) Foreign Application Priority Data

May 24, 2006   (JP)   ............................ P2006-144330

(51) Int. Cl.
   *H01G 4/228*   (2006.01)
(52) U.S. Cl. ................. 361/306.3; 361/306.1; 361/307; 361/308.1; 361/303; 361/321.1
(58) Field of Classification Search ............. 361/306.3, 361/303–305, 301.4, 307, 308.1, 309, 311–313, 361/321.1, 321.2, 306.1
   See application file for complete search history.

(56) References Cited

U.S. PATENT DOCUMENTS

| | | | | |
|---|---|---|---|---|
| 6,072,687 | A * | 6/2000 | Naito et al. ................. | 361/303 |
| 6,212,060 | B1 * | 4/2001 | Liu ............................ | 361/329 |
| 6,292,351 | B1 * | 9/2001 | Ahiko et al. ............. | 361/306.3 |
| 6,515,842 | B1 * | 2/2003 | Hayworth et al. .......... | 361/303 |
| 6,795,294 | B2 | 9/2004 | Kuroda et al. | |
| 6,934,145 | B2 * | 8/2005 | Hsieh et al. .............. | 361/321.2 |
| 7,050,289 | B2 | 5/2006 | Togashi | |
| 7,224,572 | B2 * | 5/2007 | Togashi et al. ........... | 361/306.3 |
| 7,292,430 | B2 * | 11/2007 | Lee et al. ................ | 361/306.3 |

FOREIGN PATENT DOCUMENTS

| | | |
|---|---|---|
| JP | A-09-148174 | 6/1997 |
| JP | A-2000-150292 | 5/2000 |
| JP | A-2004-235556 | 8/2004 |
| KR | 10-2006-0041626 A | 5/2006 |

OTHER PUBLICATIONS

Chinese Office Action issued in Chinese Patent Application No. 2007101048898 on Jul. 3, 2009.

* cited by examiner

*Primary Examiner*—Nguyen T Ha
(74) *Attorney, Agent, or Firm*—Oliff & Berridge, PLC

(57) ABSTRACT

A first internal electrode includes a main electrode portion whose longer-side direction agrees with a longer-side direction of first and second principal faces, and a lead portion extending from an end of the main electrode portion on the first end face side toward a first side face and connected to a first terminal electrode. A second internal electrode includes a main electrode portion whose longer-side direction agrees with the longer-side direction of the first and second principal faces, and a lead portion extending from an end of the main electrode portion on the first end face side toward a second side face and connected to a second terminal electrode. A third internal electrode includes a main electrode portion whose longer-side direction agrees with the longer-side direction of the first and second principal faces, and a lead portion extending from an end of the main electrode portion on the second end face side toward the first side face and connected to the first terminal electrode. A fourth internal electrode includes a main electrode portion whose longer-side direction agrees with the longer-side direction of the first and second principal faces, and a lead portion extending from an end of the main electrode portion on the second end face side toward the second side face and connected to the second terminal electrode.

2 Claims, 7 Drawing Sheets (a)

(b)

MULTILAYER CAPACITOR

BACKGROUND OF THE INVENTION

1. Field of the Invention

The present invention relates to a multilayer capacitor.

2. Related Background Art

A known multilayer capacitor of this type is one having a capacitor element body of a substantially rectangular parallelepiped shape having a pair of principal faces of a substantially rectangular shape opposed to each other, a pair of side faces extending in a longer-side direction of the pair of principal faces so as to connect the pair of principal faces, and opposed to each other, and a pair of end faces extending in a shorter-side direction of the pair of principal faces so as to connect the pair of principal faces, and opposed to each other, and a plurality of terminal electrodes placed on the pair of side faces, respectively, in which the capacitor element body has a plurality of insulator layers laid in the opposing direction of the pair of principal faces, and a plurality of internal electrodes alternately arranged so as to be opposed with at least one insulator layer out of the plurality of insulator layers in between, and each connected to the corresponding terminal electrode (e.g., cf. Japanese Patent Application Laid-open No. 9-148174). In the multilayer capacitor described in the foregoing Laid-open No. 9-148174, the distance is short between the terminal electrodes placed on the pair of side faces, respectively, and thus electric current paths become relatively short in the multilayer capacitor. This enables reduction in equivalent series inductance (ESL).

SUMMARY OF THE INVENTION

Incidentally, concerning the multilayer capacitors, there is a further demand for increase in equivalent series resistance (ESR), depending upon their usage. For example, when a multilayer capacitor is used as a decoupling capacitor, there is the following demand. In the case of a power supply for supply of power to a central processing unit (CPU) mounted on digital electronic equipment, the voltage is decreasing more and more, while the load current is increasing. Therefore, it became very difficult to control variation in the power-supply voltage within a tolerance against abrupt change in the load current, and therefore the multilayer capacitor called a decoupling capacitor came to be connected to the power supply. An electric current is supplied from this multilayer capacitor to the CPU during a transient change in the load current, so as to suppress the variation in the power-supply voltage. In recent years, the load current becomes faster and greater with further increase in the operating frequency of the CPU to higher frequencies, and there is a demand for increase of capacitance and ESR in the multilayer capacitor used as the decoupling capacitor.

In the multilayer capacitor described in the aforementioned Laid-open No. 9-148174, however, the longer sides of the internal electrodes of the rectangular shape are connected to the terminal electrodes, and thus the ESR is small. For this reason, the multilayer capacitor described in the Laid-open No. 9-148174 failed to satisfy the aforementioned demand for increase of ESR.

An object of the present invention is to provide a multilayer capacitor capable of achieving increase in ESR while suppressing increase in ESL.

A multilayer capacitor according to the present invention is a multilayer capacitor comprising: a capacitor element body of a substantially rectangular parallelepiped shape having first and second principal faces of a substantially rectangular shape opposed to each other, first and second side faces extending in a longer-side direction of the first and second principal faces so as to connect the first and second principal faces, and opposed to each other, and first and second end faces extending in a shorter-side direction of the first and second principal faces so as to connect the first and second principal faces, and opposed to each other; a first terminal electrode placed on the first side face; and a second terminal electrode placed on the second side face; wherein the capacitor element body has a plurality of insulator layers laid in an opposing direction of the first and second principal faces, a first internal electrode pair including first and second internal electrodes arranged so as to be opposed with at least one insulator layer out of the plurality of insulator layers in between, and a second internal electrode pair including third and fourth internal electrodes arranged so as to be opposed with at least one insulator layer out of the plurality of insulator layers in between; wherein the first internal electrode includes a main electrode portion whose longer-side direction agrees with the longer-side direction of the first and second principal faces, and a lead portion extending from an end of the main electrode portion on the first end face side toward the first side face and connected to the first terminal electrode; wherein the second internal electrode includes a main electrode portion whose longer-side direction agrees with the longer-side direction of the first and second principal faces, and a lead portion extending from an end of the main electrode portion on the first end face side toward the second side face and connected to the second terminal electrode; wherein the third internal electrode includes a main electrode portion whose longer-side direction agrees with the longer-side direction of the first and second principal faces, and a lead portion extending from an end of the main electrode portion on the second end face side toward the first side face and connected to the first terminal electrode; and wherein the fourth internal electrode includes a main electrode portion whose longer-side direction agrees with the longer-side direction of the first and second principal faces, and a lead portion extending from an end of the main electrode portion on the second end face side toward the second side face and connected to the second terminal electrode.

In the multilayer capacitor according to the present invention, since each of the first to fourth internal electrodes includes the lead portion extending from the end of the main electrode portion, a narrowed portion of an electric current path is formed on the electric current path of each internal electrode, so as to increase the ESR.

In the multilayer capacitor according to the present invention, an electric current flows through the lead portion to the main electrode portion in each internal electrode. For this reason, the ESL increases, but the increase can be well suppressed because of the following phenomena.

Since the lead portion of the first internal electrode extends from the end of the main electrode portion on the first end face side and the lead portion of the second internal electrode extends from the end of the main electrode portion on the first end face side, electric currents flow in mutually opposite directions in the main electrode portion of the first internal electrode and in the main electrode portion of the second internal electrode. This results in canceling out magnetic fields generated by the electric currents, between the first internal electrode and the second internal electrode, so as to decrease the ESL of the multilayer capacitor.

Furthermore, since the lead portion of the third internal electrode extends from the end of the main electrode portion on the second end face side and the lead portion of the fourth internal electrode extends from the end of the main electrode portion on the second end face side, electric currents flow in mutually opposite directions in the main electrode portion of the third internal electrode and in the main electrode portion of the fourth internal electrode. This results in canceling out magnetic fields generated by the electric currents, between the third internal electrode and the fourth internal electrode, so as to decrease the ESL of the multilayer capacitor.

Furthermore, in the entire multilayer capacitor, apparently, an inductor component interposed between connections of the lead portions located on the first end face side, to the respective terminal electrodes is connected in parallel to an inductor component interposed between connections of the lead portions located on the second end face side, to the respective terminal electrodes. This can also decrease the ESL of the multilayer capacitor.

Preferably, the capacitor element body further has a third internal electrode pair including fifth and sixth internal electrodes arranged so as to be opposed with at least one insulator layer out of the plurality of insulator layers in between; the fifth internal electrode includes a main electrode portion whose longer-side direction agrees with the longer-side direction of the first and second principal faces, and a lead portion extending from a central part in the longer-side direction of the main electrode portion toward the first side face and connected to the first terminal electrode; and the sixth internal electrode includes a main electrode portion whose longer-side direction agrees with the longer-side direction of the first and second principal faces, and a lead portion extending from a central part in the longer-side direction of the main electrode portion toward the second side face and connected to the second terminal electrode. In this case, an inductor component interposed between connections of the lead portions located in the central parts in the longer-side direction of the main electrode portions, to the respective terminal electrodes is further connected in parallel. This results in further decreasing the ESL of the multilayer capacitor.

The present invention successfully provides the multilayer capacitor capable of achieving the increase in ESR while suppressing the increase in ESL.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The preferred embodiments of the present invention will be described below in detail with reference to the accompanying drawings. In the description the same elements or elements with the same functionality will be denoted by the same reference symbols, without redundant description.

Figure 1:
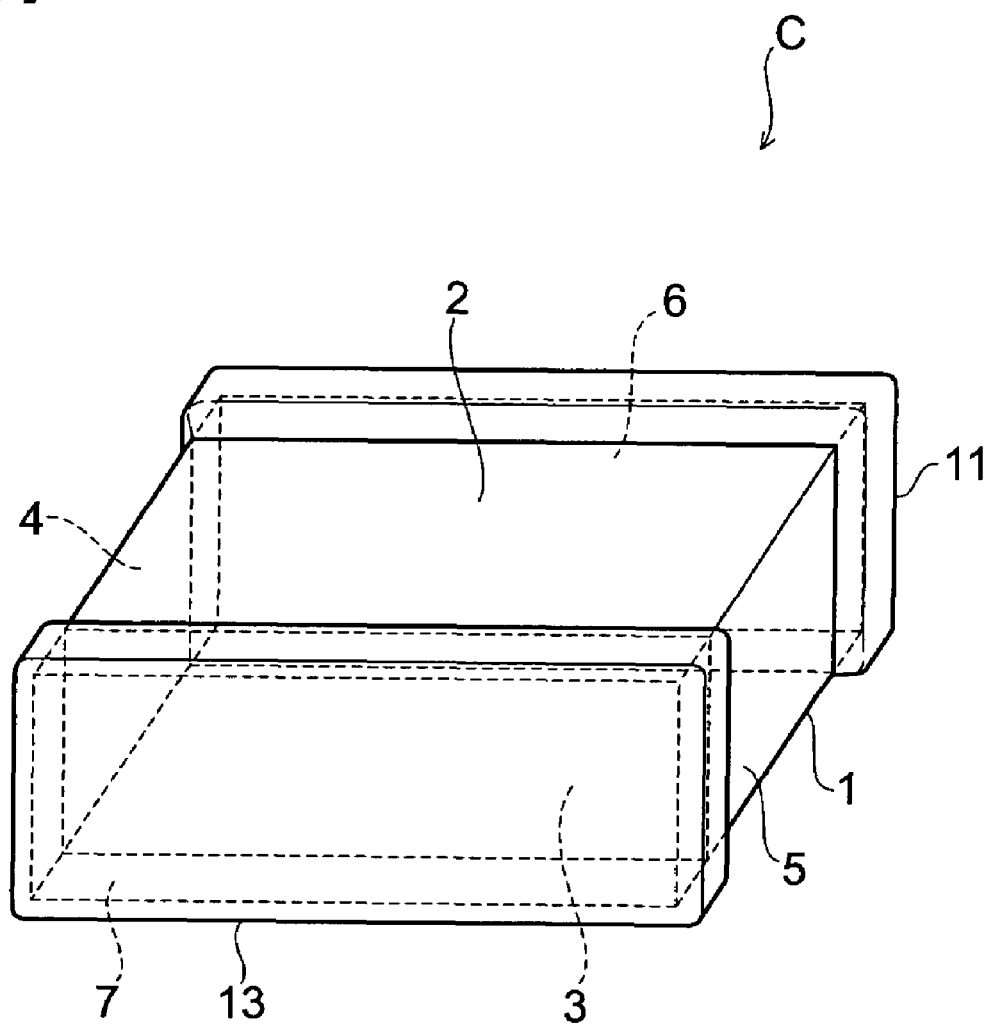
FIG. 1 is a perspective view of a multilayer capacitor according to an embodiment of the present invention.
Figure 2:
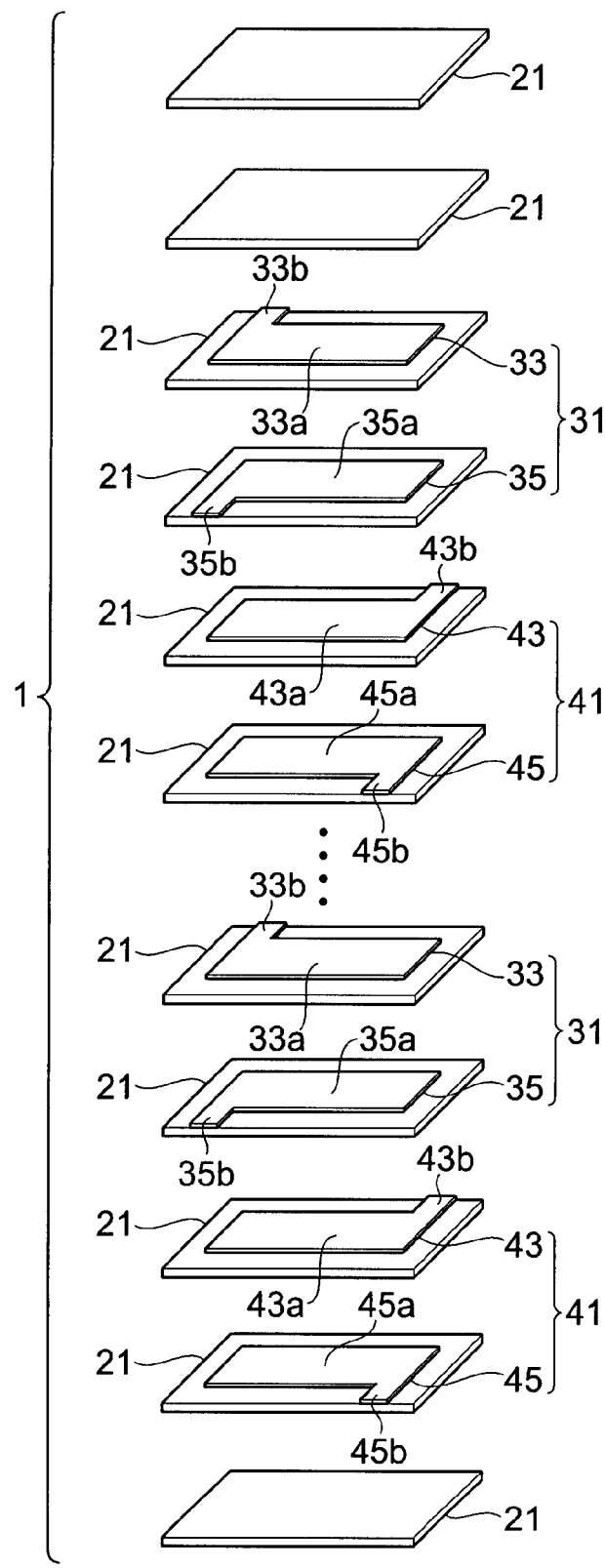
FIG. 2 is an exploded perspective view of a capacitor element body included in the multilayer capacitor according to the embodiment.
Figure 3:
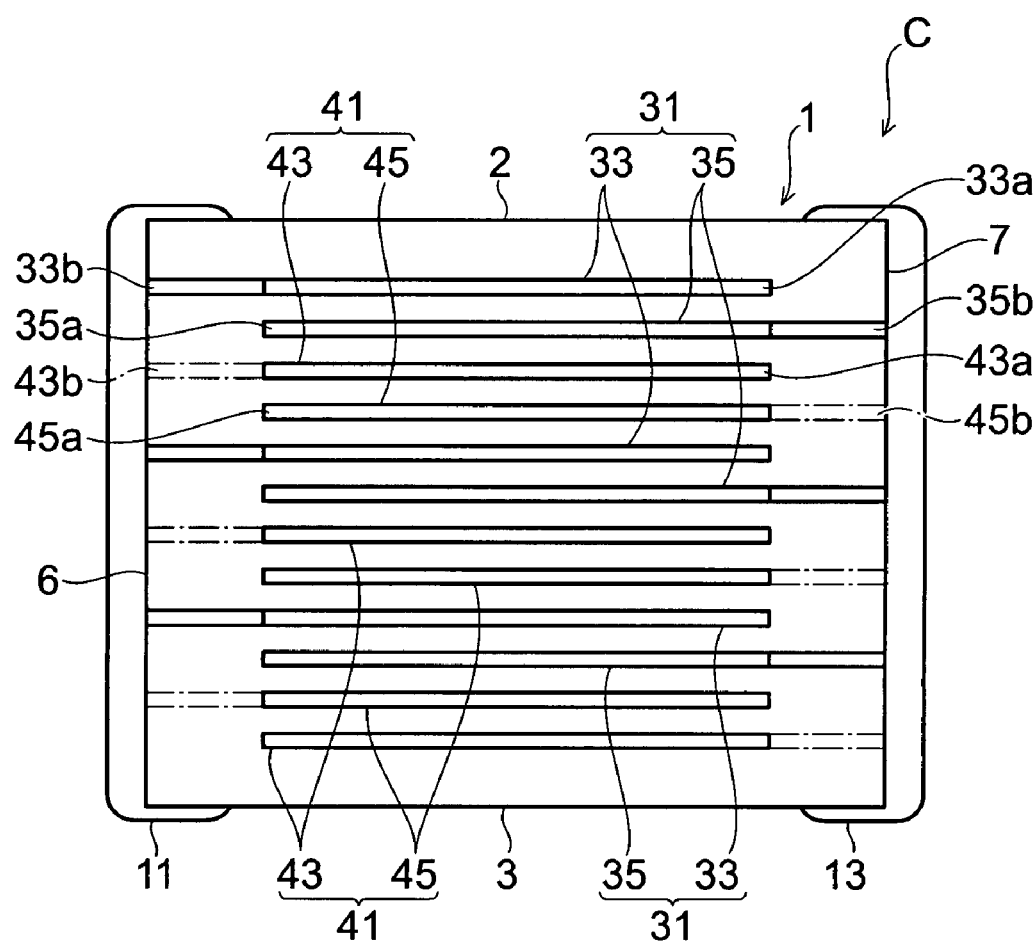
FIG. 3 is a schematic view for explaining a sectional configuration of the multilayer capacitor according to the embodiment.

First, a configuration of a multilayer capacitor C according to an embodiment of the present invention will be described on the basis of FIGS. 1 to 3. FIG. 1 is a perspective view of the multilayer capacitor according to the present embodiment. FIG. 2 is an exploded perspective view of a capacitor element body included in the multilayer capacitor according to the present embodiment. FIG. 3 is a schematic view for explaining a sectional configuration of the multilayer capacitor according to the present embodiment.

The multilayer capacitor C, as shown in FIG. 1, is comprised of a capacitor element body 1 of a rectangular parallelepiped shape, and a first terminal electrode 11 and a second terminal electrode 13 placed on the exterior of the capacitor element body 1. The capacitor element body 1 includes a first principal face 2 and a second principal face 3 of a rectangular shape opposed to each other, a first end face 4 and a second end face 5 opposed to each other, and a first side face 6 and a second side face 7 opposed to each other. The first and second end faces 4, 5 extend in the shorter-side direction of the first and second principal faces 2, 3 so as to connect the first and second principal faces 2, 3. The first and second side faces 6, 7 extend in the longer-side direction of the first and second principal faces 2, 3 so as to connect the first and second principal faces 2, 3.

The first terminal electrode 11 is placed on the first side face 6 of the capacitor element body 1. The first terminal electrode 11 is formed up to some regions on the first and second principal faces 2, 3 and on the first and second end faces 4, 5 so as to cover the first side face 6. The second terminal electrode 13 is placed on the second side face 7 of the capacitor element body 1. The second terminal electrode 13 is formed up to some regions on the first and second principal faces 2, 3 and on the first and second end faces 4, 5 so as to cover the second side face 7. The first and second terminal electrodes 11, 13 are made, for example, by applying an electroconductive paste containing electroconductive metal powder and glass frit onto the corresponding exterior faces of the capacitor element body 1 and baking it. A plated layer may be formed on the baked electrodes according to need.

The capacitor element body 1, as shown in FIGS. 2 and 3, has a plurality of insulator layers 21, a plurality of first internal electrode pairs 31, and a plurality of second internal electrode pairs 41. The insulator layers 21 each extend in a direction parallel to the first and second principal faces 2, 3 and are laminated in the opposing direction of the first and second principal faces 2, 3. Each insulator layer 21 is composed, for example, of a sintered body of a ceramic green sheet containing a dielectric ceramic. In a practical multilayer capacitor C, the insulator layers 21 are integrally formed so that no boundary can be visually recognized between the insulator layers 21. The first internal electrode pairs 31 and the second internal electrode pairs 41 are alternately arranged in the laminating direction of the insulator layers 21, or in the opposing direction of the first and second principal faces 2, 3 in the capacitor element body 1.

A first internal electrode pairs 31 includes a first internal electrode 33 and a second internal electrode 35 arranged so as to be opposed with at least one insulator layer 21 in between.

The first internal electrode 33 includes a main electrode portion 33a and a lead portion 33b. The main electrode portion 33a is of a rectangular shape and its longer-side direction agrees with the longer-side direction of the first and second principal faces 2, 3. The lead portion 33b extends from an end of the main electrode portion 33a on the first end face 4 side toward the first side face 6 and is led to the first side face 6. The lead portion 33b is electrically and physically connected to the first terminal electrode 11. This leads the first internal electrode 33 to be electrically connected to the first terminal electrode 11. The width of the lead portion 33b (length in the longer-side direction of the main electrode portion 33a, or length in the opposing direction of the first and second end faces 4, 5) is smaller than the length of the longer sides of the main electrode portion 33a. The first internal electrode 33 is comprised of a sintered body of an electroconductive paste.

A second internal electrode 35 includes a main electrode portion 35a and a lead portion 35b. The main electrode portion 35a is of a rectangular shape and its longer-side direction agrees with the longer-side direction of the first and second principal faces 2, 3. The lead portion 35b extends from an end of the main electrode portion 35a on the first end face 4 side toward the second side face 7 and is led to the second side face 7. The lead portion 35b is electrically and physically connected to the second terminal electrode 13. This leads the second internal electrode 35 to be electrically connected to the second terminal electrode 13. The width of the lead portion 35b (length in the longer-side direction of the main electrode portion 35a, or length in the opposing direction of the first and second end faces 4, 5) is smaller than the length of the longer sides of the main electrode portion 35a. The second internal electrode 35 is comprised of the sintered body of the electroconductive paste.

The main electrode portion 33a of the first internal electrode 33 and the main electrode portion 35a of the second internal electrode 35 are opposed to each other with the insulator layer 21 in between. This establishes a predetermined capacitance component.

A second internal electrode pair 41 includes a third internal electrode 43 and a fourth internal electrode 45 arranged so as to be opposed with at least one insulator layer 21 in between.

The third internal electrode 43 includes a main electrode portion 43a and a lead portion 43b. The main electrode portion 43a is of a rectangular shape and its longer-side direction agrees with the longer-side direction of the first and second principal faces 2, 3. The lead portion 43b extends from an end of the main electrode portion 43a on the second end face 5 side toward the first side face 6 and is led to the first side face 6. The lead portion 43b is electrically and physically connected to the first terminal electrode 11. This leads the third internal electrode 43 to be electrically connected to the first terminal electrode 11. The width of the lead portion 43b (length in the longer-side direction of the main electrode portion 43a, or length in the opposing direction of the first and second end faces 4, 5) is smaller than the length of the longer sides of the main electrode portion 43a. The third internal electrode 43 is comprised of the sintered body of the electroconductive paste.

The fourth internal electrode 45 includes a main electrode portion 45a and a lead portion 45b. The main electrode portion 45a is of a rectangular shape and its longer-side direction agrees with the longer-side direction of the first and second principal faces 2, 3. The lead portion 45b extends from an end of the main electrode portion 45a on the second end face 5 side toward the second side face 7 and is led to the second side face 7. The lead portion 45b is electrically and physically connected to the second terminal electrode 13. This leads the fourth internal electrode 45 to be electrically connected to the second terminal electrode 13. The width of the lead portion 45b (length in the longer-side direction of the main electrode portion 45a, or length in the opposing direction of the first and second end faces 4, 5) is smaller than the length of the longer sides of the main electrode portion 45a. The main electrode portion 43a of the third internal electrode 43 and the main electrode portion 45a of the fourth internal electrode 45 are opposed to each other with the insulator layer 21 in between. The fourth internal electrode 45 is comprised of the sintered body of the electroconductive paste.

The main electrode portion 43a of the third internal electrode 43 and the main electrode portion 45a of the fourth internal electrode 45 are opposed to each other with the insulator layer 21 in between. This establishes a predetermined capacitance component. In the present embodiment, the main electrode portion 33a of the first internal electrode 33 and the main electrode portion 45a of the fourth internal electrode 45 are also opposed to each other with the insulator layer 21 in between, and the main electrode portion 35a of the second internal electrode 35 and the main electrode portion 43a of the third internal electrode 43 are also opposed to each other with the insulator layer 21 in between. These also establish predetermined capacitance components.

In the present embodiment, as described above, each of the first to fourth internal electrodes, 33, 35, 43, 45 includes the lead portion 33b, 35b, 43b, 45b extending from the end of the main electrode portion 33a, 35a, 43a, 45a. This forms a narrowed portion of an electric current path on the electric current path of each internal electrode 33, 35, 43, 45 to increase the ESR of the multilayer capacitor C.

Incidentally, in the multilayer capacitor C, an electric current flows through the lead portion 33b, 35b, 43b, 45b to the main electrode portion 33a, 35a, 43a, 45a in each internal electrode 33, 35, 43, 45. This increases the ESL, but the increase can be well suppressed because of the following phenomena.

Figure 4:
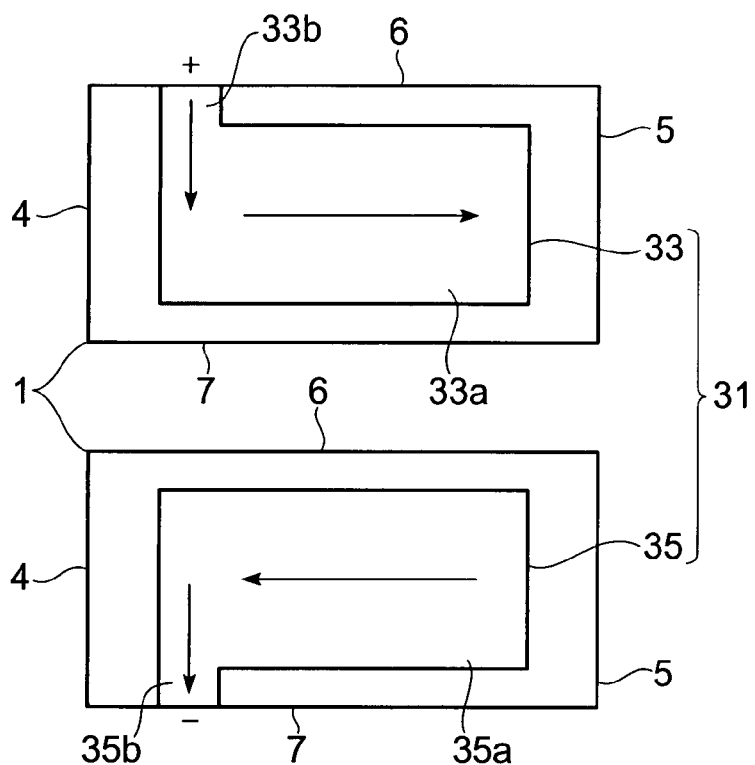
FIG. 4 is a schematic view for explaining directions of electric currents in internal electrodes.
Figure 4:
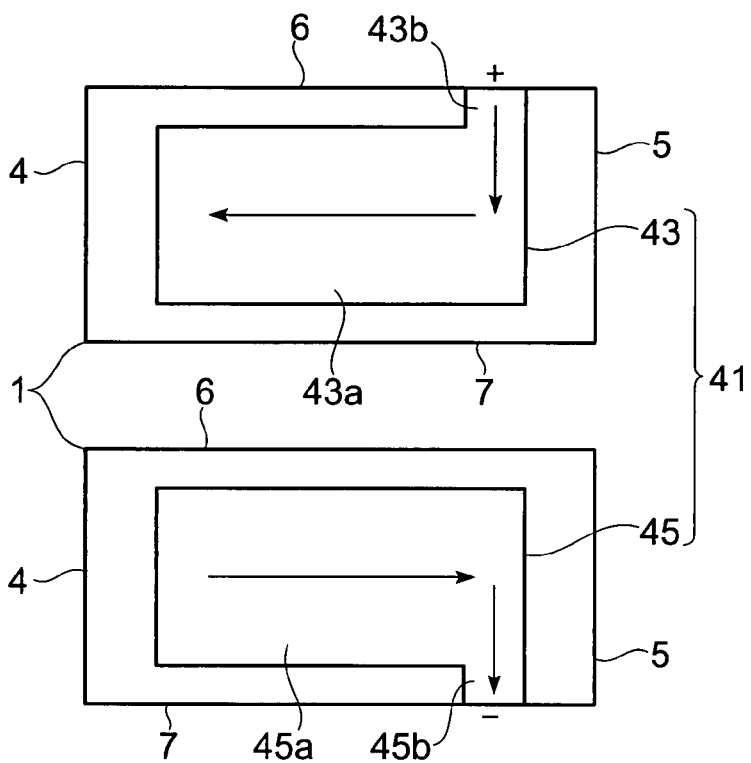

Since the lead portion 33b of the first internal electrode 33 extends from the end of the main electrode portion 33a on the first end face 4 side and the lead portion 35b of the second internal electrode 35 extends from the end of the main electrode portion 35a on the first end face 4 side, electric currents flow in mutually opposite directions in the main electrode portion 33a of the first internal electrode 33 and in the main electrode portion 35a of the second internal electrode 35, as shown in (a) of FIG. 4. This results in canceling out magnetic fields generated by the electric currents, between the first internal electrode 33 and the second internal electrode 35, so as to decrease the ESL of the multilayer capacitor C. Arrows in FIG. 4 indicate directions of the electric currents with the first terminal electrode 11 being a positive electrode and the second terminal electrode 13 being a negative electrode.

Since the lead portion 43b of the third internal electrode 43 extends from the end of the main electrode portion 43a on the second end face 5 side and the lead portion 45b of the fourth internal electrode 45 extends from the end of the main electrode portion 45a on the second end face 5 side, electric currents flow in mutually opposite directions in the main electrode portion 43a of the third internal electrode 43 and in the main electrode portion 45a of the fourth internal electrode 45, as shown in (b) of FIG. 4. This results in canceling out magnetic fields generated by the electric currents, between the third internal electrode 43 and the fourth internal electrode 45, so as to decrease the ESL of the multilayer capacitor C.

Furthermore, in the entire multilayer capacitor C, apparently, there are the following inductor components connected in parallel: an inductor component interposed between the connections between the lead portions 33b located on the first end face 4 side and the first terminal electrode 11 and the connections between the lead portions 35b located on the first end face 4 side and the second terminal electrode 13; and an inductor component interposed between the connections between the lead portions 43b located on the second end face 5 side and the first terminal electrode 11 and the connections between the lead portions 45b located on the second end face 5 side and the second terminal electrode 13. This can also decrease the ESL of the multilayer capacitor C.

Figure 5:
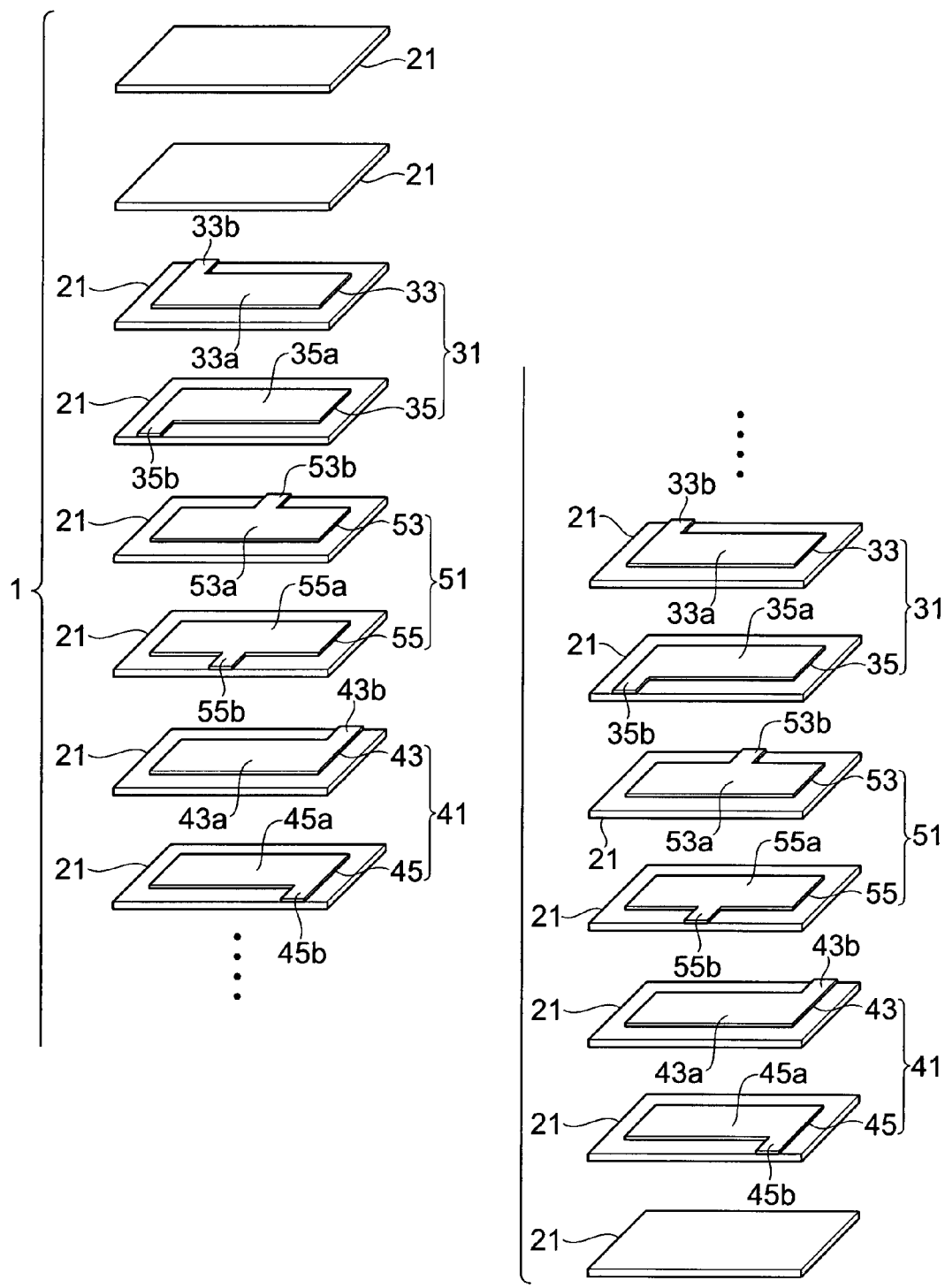
FIG. 5 is an exploded perspective view of a capacitor element body included in a multilayer capacitor according to a modification example of the embodiment.
Figure 6:
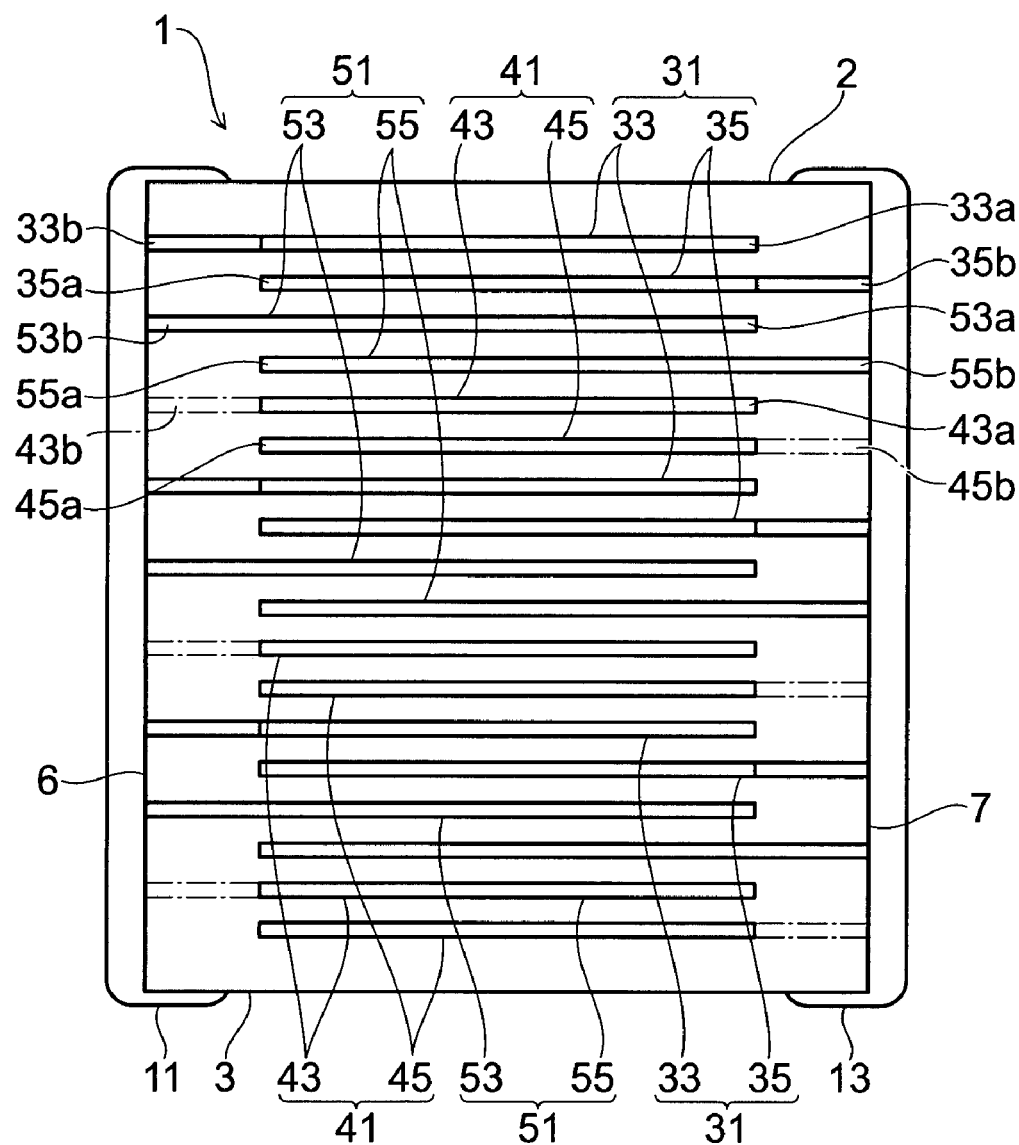
FIG. 6 is a schematic view for explaining a sectional configuration of the multilayer capacitor according to the modification example of the embodiment.

Subsequently, a modification example of the present embodiment will be described on the basis of FIGS. 5 and 6. FIG. 5 is an exploded perspective view of a capacitor element body included in a multilayer capacitor according to the modification example of the present embodiment. FIG. 6 is a schematic view for explaining a sectional configuration of the multilayer capacitor according to the modification example of the present embodiment.

Just as the aforementioned multilayer capacitor C was, the multilayer capacitor according to the modification example of the present embodiment is comprised of a capacitor element body 1, a first terminal electrode 11, and a second terminal electrode 13, which are not depicted herein. The capacitor element body 1, as shown in FIGS. 5 and 6, has a plurality of insulator layers 21, a plurality of first internal electrode pairs 31, a plurality of second internal electrode pairs 41, and a plurality of third internal electrode pairs 51. Each third internal electrode pair 51 is disposed between a first internal electrode pair 31 and a second internal electrode pair 41 in the capacitor element body 1.

A third internal electrode pair 51 includes a fifth internal electrode 53 and a sixth internal electrode 55 arranged so as to be opposed to each other with at least one insulator layer 21 in between.

The fifth internal electrode 53 includes a main electrode portion 53a and a lead portion 53b. The main electrode portion 53a is of a rectangular shape and its longer-side direction agrees with the longer-side direction of the first and second principal faces 2, 3. The lead portion 53b extends from a central portion in the longer-side direction of the main electrode portion 53a toward the first side face 6 and is led to the first side face 6. The lead portion 53b is electrically and physically connected to the first terminal electrode 11. This leads the fifth internal electrode 53 to be electrically connected to the first terminal electrode 11. The width of the lead portion 53b (length in the longer-side direction of the main electrode portion 53a, or length in the opposing direction of the first and second end faces 4, 5) is smaller than the length of the longer sides of the main electrode portion 53a. The fifth internal electrode 53 is comprised of the sintered body of the electroconductive paste.

The sixth internal electrode 55 includes a main electrode portion 55a and a lead portion 55b. The main electrode portion 55a is of a rectangular shape and its longer-side direction agrees with the longer-side direction of the first and second principal faces 2, 3. The lead portion 55b extends from a central portion in the longer-side direction of the main electrode portion 55a toward the second side face 7 and is led to the second side face 7. The lead portion 55b is electrically and physically connected to the second terminal electrode 13. This leads the second internal electrode 55 to be electrically connected to the second terminal electrode 13. The width of the lead portion 55b (length in the longer-side direction of the main electrode portion 55a, or length in the opposing direction of the first and second end faces 4, 5) is smaller than the length of the longer sides of the main electrode portion 55a. The sixth internal electrode 55 is comprised of the sintered body of the electroconductive paste.

The main electrode portion 53a of the fifth internal electrode 53 and the main electrode portion 55a of the sixth internal electrode 55 are opposed to each other with the insulator layer 21 in between. This establishes a predetermined capacitance component. The main electrode portion 35a of the second internal electrode 35 and the main electrode portion 53a of the fifth internal electrode 53 are also opposed to each other with the insulator layer 21 in between, and the main electrode portion 55a of the sixth internal electrode 55 and the main electrode portion 43a of the third internal electrode 43 are also opposed to each other with the insulator layer 21 in between. These also establish predetermined capacitance components.

In the modification example of the embodiment, as described above, each of the first to sixth internal electrodes 33, 35, 43, 45, 53, 55 includes the lead portion 33b, 35b, 43b, 45b, 53b, 55b extending from the end of the main electrode portion 33a, 35a, 43a, 45a, 53a, 55a. This forms a narrowed portion of an electric current path on the electric current path of each internal electrode 33, 35, 43, 45, 53, 55 to increase the ESR of the multilayer capacitor.

In the modification example, in addition to the aforementioned embodiment, the increase in the ESL of the multilayer capacitor can be more suppressed because of the following phenomena.

Figure 7:
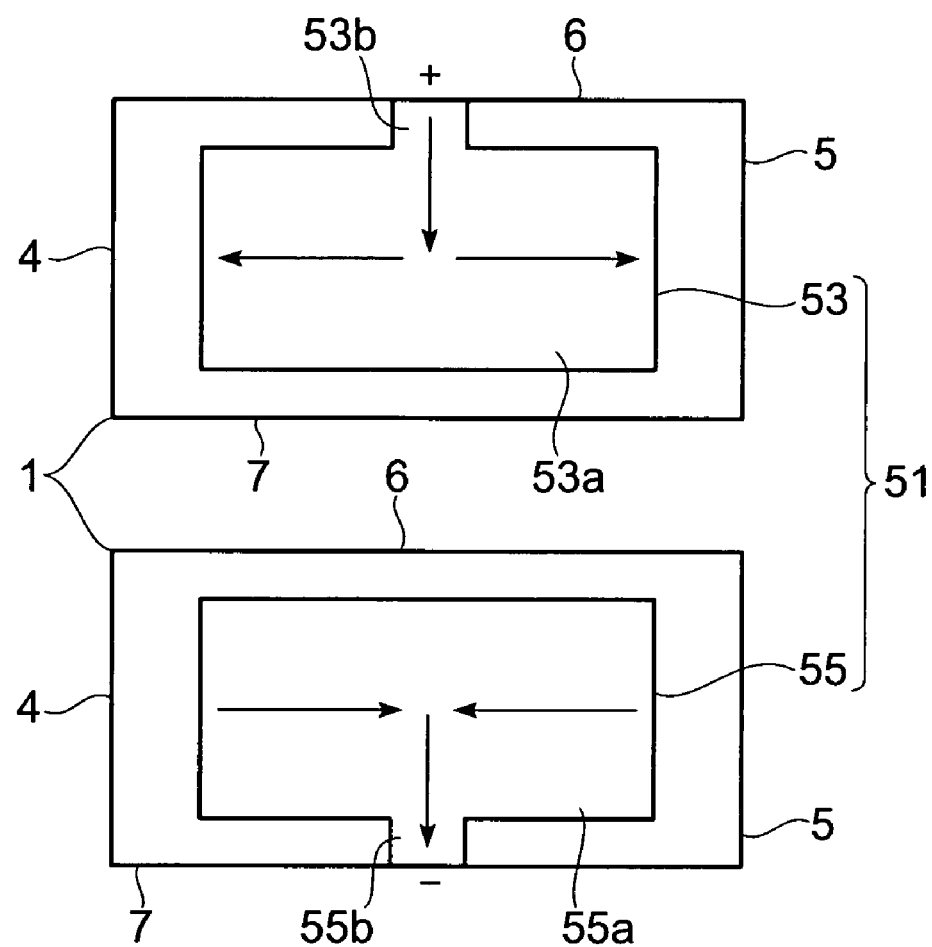
FIG. 7 is a schematic view for explaining directions of electric currents in internal electrodes.

Since the lead portion 53b of the fifth internal electrode 53 extends from the central part in the longer-side direction of the main electrode portion 53a and the lead portion 55b of the sixth internal electrode 55 extends from the central part in the longer-side direction of the main electrode portion 55a, electric currents flow in mutually opposite directions in the main electrode portion 53a of the fifth internal electrode 53 and in the main electrode portion 55a of the sixth internal electrode 55, as shown in FIG. 7. This results in canceling out magnetic fields generated by the electric currents, between the fifth internal electrode 53 and the sixth internal electrode 55, so as to decrease the ESL of the multilayer capacitor. Arrows in FIG. 7 indicate directions of the electric currents with the first terminal electrode 11 being a positive electrode and the second terminal electrode 13 being a negative electrode.

Furthermore, in the entire multilayer capacitor C, apparently, there are the following inductor components connected in parallel: the inductor component interposed between the connections between the lead portions 33b located on the first end face 4 side and the first terminal electrode 11 and the connections between the lead portions 35b located on the first end face 4 side and the second terminal electrode 13; the inductor component interposed between the connections between the lead portions 43b located on the second end face 5 side and the first terminal electrode 11 and the connections between the lead portions 45b located on the second end face 5 side and the second terminal electrode 13; and an inductor component interposed between the connections between the lead portions 53b located in the central parts in the longer-side direction of the main electrode portions 53a, 55a and the first terminal electrode 11 and the connections between the lead portions 55b located in the central parts in the longer-side direction of the main electrode portions 53a, 55a and the second terminal electrode 13. This results in further decreasing the ESL of the multilayer capacitor.

The above described the preferred embodiment of the present invention, but it is noted that the present invention is not necessarily limited to the aforementioned embodiment but can be modified in various ways without departing from the spirit and scope of the invention.

For example, the laminating numbers of insulator layers 21 and each of the internal electrodes 33, 35, 43, 45, 53, 55 are not limited to those illustrated.

In the present embodiment the first internal electrode pairs 31 and the second internal electrode pairs 41 are alternately arranged in the laminating direction of insulator layers 21, but the locations of the first internal electrode pairs 31 and the second internal electrode pairs 41 are not limited to it. For example, they may be so arranged that the plurality of first internal electrode pairs 31 are continuously arranged in the laminating direction of the insulator layers 21 and that the plurality of second internal electrode pairs 41 are continuously arranged in the laminating direction of the insulator layers 21. In the aforementioned modification example the locations of the first internal electrode pairs 31, second internal electrode pairs 41, and third internal electrode pairs 51 do not have to be limited to those illustrated, either. For example, each group of the first internal electrode pairs 31, second internal electrode pairs 41, and third internal electrode pairs 51 may be continuously arranged in the laminating direction of the insulator layers 21.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor comprising:
a capacitor element body of a substantially rectangular parallelepiped shape having first and second principal faces of a substantially rectangular shape opposed to each other, first and second side faces extending in a longer-side direction of the first and second principal faces so as to connect the first and second principal faces, and opposed to each other, and first and second end faces extending in a shorter-side direction of the first and second principal faces so as to connect the first and second principal faces, and opposed to each other;
a first terminal electrode placed on the first side face; and
a second terminal electrode placed on the second side face;
wherein the capacitor element body has a plurality of insulator layers laid in an opposing direction of the first and second principal faces, a first internal electrode pair including first and second internal electrodes arranged so as to be opposed with at least one insulator layer out of the plurality of insulator layers in between, and a second internal electrode pair including third and fourth internal electrodes arranged so as to be opposed with at least one insulator layer out of the plurality of insulator layers in between;
wherein the first internal electrode includes a main electrode portion whose longer-side direction agrees with the longer-side direction of the first and second principal faces, and a lead portion extending from an end of the main electrode portion on the first end face side toward the first side face and connected to the first terminal electrode;
wherein the second internal electrode includes a main electrode portion whose longer-side direction agrees with the longer-side direction of the first and second principal faces, and a lead portion extending from an end of the main electrode portion on the first end face side toward the second side face and connected to the second terminal electrode;
wherein the third internal electrode includes a main electrode portion whose longer-side direction agrees with the longer-side direction of the first and second principal faces, and a lead portion extending from an end of the main electrode portion on the second end face side toward the first side face and connected to the first terminal electrode; and
wherein the fourth internal electrode includes a main electrode portion whose longer-side direction agrees with the longer-side direction of the first and second principal faces, and a lead portion extending from an end of the main electrode portion on the second end face side toward the second side face and connected to the second terminal electrode.

2. The multilayer capacitor according to claim 1, wherein the capacitor element body further has a third internal electrode pair including fifth and sixth internal electrodes arranged so as to be opposed with at least one insulator layer out of the plurality of insulator layers in between;
wherein the fifth internal electrode includes a main electrode portion whose longer-side direction agrees with the longer-side direction of the first and second principal faces, and a lead portion extending from a central part in the longer-side direction of the main electrode portion toward the first side face and connected to the first terminal electrode; and
wherein the sixth internal electrode includes a main electrode portion whose longer-side direction agrees with the longer-side direction of the first and second principal faces, and a lead portion extending from a central part in the longer-side direction of the main electrode portion toward the second side face and connected to the second terminal electrode.

* * * * *